United States Patent [19]
Boots

[11] 4,407,541
[45] Oct. 4, 1983

[54] SLIDING ROOF
[75] Inventor: Robert T. Boots, Haarlem, Netherlands
[73] Assignee: Vermeulen-Hollandia Octrooien B.V., Haarlem, Netherlands
[21] Appl. No.: 273,107
[22] Filed: Jun. 12, 1981
[30] Foreign Application Priority Data
    Jun. 24, 1980 [NL] Netherlands ........................ 8003639
[51] Int. Cl.³ .............................................. B60J 7/04
[52] U.S. Cl. ..................................... 296/216; 296/221
[58] Field of Search ................ 296/216, 221, 222, 223
[56]           References Cited
         U.S. PATENT DOCUMENTS
    4,085,965  4/1978  Schlapp .............................. 296/221
    4,179,156  12/1979 Huisman ............................. 296/216
    4,272,122  6/1981  Schätzler ........................... 296/221

Primary Examiner—Joseph F. Peters, Jr.
Assistant Examiner—John A. Carroll
Attorney, Agent, or Firm—Kane, Dalsimer, Kane, Sullivan and Kurucz

[57] ABSTRACT

A sliding roof for a vehicle is provided including a panel. In the forward position, the panel closes an opening in a fixed roof. Upon operation of an actuating member, the rear edge of the panel is raised and is partly displaceable outside the roof opening into positions above the fixed roof. The panel is supported near its front edge by a horizontal cross-shaft of at least one front support. The front support is movable backward and forward in the longitudinal direction of the vehicle. At least one cross-pin at the upper end of a lever engages the panel backwards from the front support. The lever is pivotally supported at its lower end for pivotal movement about a horizontal transverse axis. The actuating member engages the front support and moves the same in the longitudinal direction of the vehicle in order to displace the panel while the cross pin at the upper end of the lever is rotatably and slidably engaged with a slot formed underneath the panel. Therefore, during a displacement of the panel from the front position, the lever first reaches a position defined by a stop, whereafter the cross-pin passes through the slot; and vice-versa.

20 Claims, 13 Drawing Figures fig.1 fig.2 fig.3 fig.8 fig.9 fig.10 fig.11

SLIDING ROOF

BACKGROUND OF THE INVENTION

The invention relates to a sliding roof for a vehicle, comprising a panel, which in its forward position closes an opening in the fixed roof and which, upon operation of an actuating member, raises its rear edge and is partly displaceable outside the roof opening into positions above the fixed roof, the panel near its front edge being supported by a horizontal cross-shaft of at least one front support, said front support being movable backward and forward in the longitudinal direction of the vehicle, whilst at least one cross-pin at the upper end of a lever engages the panel backwards from the front support, said lever being pivotally supported at its lower end for pivotal movement about a horizontal transverse axis.

In a known embodiment of a sliding roof of this type the two levers are rigidly interconnected at their lower end by means of an intermediate, pivotally supported, transversely extending connecting rod. The actuating member engages this connecting rod and achieves an angular displacement of this connecting rod for displacing the panel. In order to make it possible to lock the panel in every position, a brake means acts on the connecting rod.

This known sliding roof shows several advantages with respect to another known sliding roof of the kind wherein the panel is first moved downwardly with its rear edge and is subsequently slid underneath the fixed roof in order to be displaced to a wholly or partly opened position. The construction of the first-mentioned sliding roof is simpler and cheaper and this sliding roof can also be applied, if the vehicle only has a short fixed roof portion behind the opening. Furthermore this sliding roof does not cause a loss of height within the vehicle. On the other hand, however, the first-mentioned known sliding roof shows a great disadvantage with respect to sliding roofs wherein the panel is slidable underneath the fixed roof, as even in the rear end position of the panel the portion of the opening which is released by the panel at its front side is only small.

SUMMARY OF THE INVENTION

It is an object of the present invention to provide a sliding roof for a vehicle, which substantially unites the advantages of both sliding roof constructions described hereinbefore.

To this end the sliding roof according to the invention is characterized in that the actuating member engages the front support and moves the same in the longitudinal direction of the vehicle in order to displace the panel, whilst the cross-pin at the upper end of the lever is rotatably and slidably engaged with a slot formed underneath the panel, so that during a displacement of the panel from the front position, the lever first reaches a position defined by a stop, whereafter the cross-pin passes through the slot; and vice versa.

The panel of the sliding roof according to the invention can therefore be moved back much further, so that the portion of the opening which is released by the panel at its front side can be very large in dependence of the selected length of the slot.

In a simple embodiment of the sliding roof according to the invention on either side a section is mounted underneath the panel, which sections extend in the longitudinal direction of the vehicle, each of these two sections being pivotally connected to a cooperating front support and being provided with a slot, with which a cross-pin is in engagement which is connected to a lever which is pivotally supported on the relative side.

In this case the two front supports may each be movable backward and forward along a hollow guide rod extending in the longitudinal direction of the vehicle and having a longitudinal slot, through which a lip of the cooperating front support is passed, whilst the actuating member displaces the front supports by means of flexible cables.

By the application of an actuating member with built-in brake means the panel will be held in any given position with sufficient force, so that it retains its position without rattling or other inconvenient sounds when the vehicle is driven.

BRIEF DESCRIPTION OF THE DRAWINGS

The invention will hereinafter be elucidated with reference to the drawings, which schematically show several embodiments of a sliding roof according to the invention by way of example.

DESCRIPTION OF A PREFERRED EMBODIMENT

FIGS. 1–7 show a first embodiment of a sliding roof for a vehicle by way of example. This sliding roof comprises a panel 1, which in its front position closes an opening 2 in the fixed roof 3 and which, while raising its rear edge 4 may be displaced backwards in an oblique position, partly outside the roof opening 2 into positions above the fixed roof.

Figure 1:
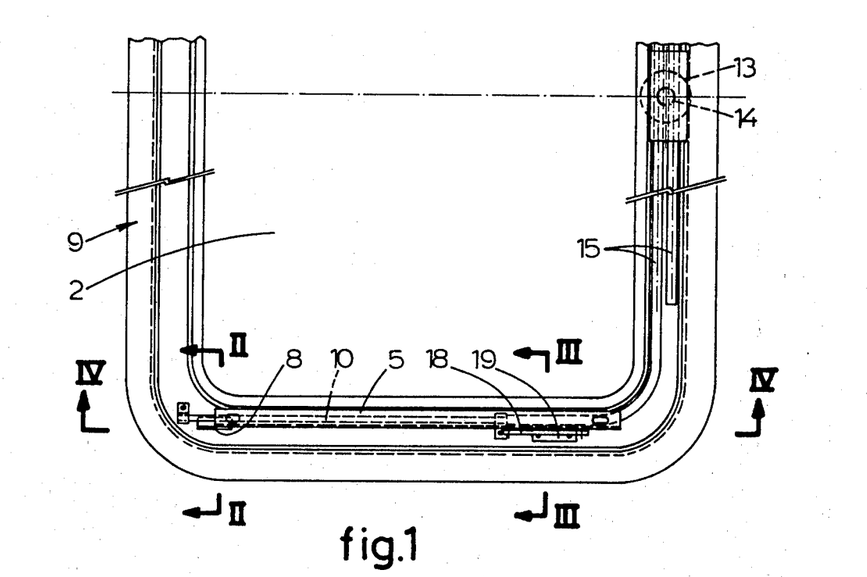
FIG. 1 is a partial top view of a first embodiment of the sliding roof according to the invention, wherein the panel is omitted.
Figure 2:
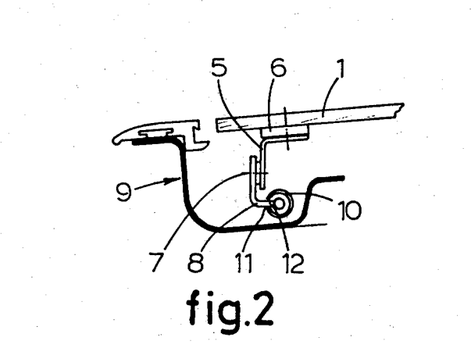
FIG. 2 is a section along the line II—II in FIG. 1 on a larger scale.
Figure 3:
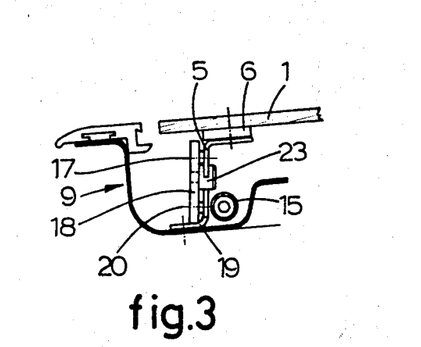
FIG. 3 is a section along the line III—III in FIG. 1 on a larger scale.

To this end an angle section 5 extending in the longitudinal direction of the vehicle is mounted on both sides underneath the panel 1 with the interposition of elastic rings 6. Each angle section 5 is supported on its front end on a front support 8 and may pivot about a horizontal cross-shaft 7 with respect thereto. Each front support 8 may be moved backward and forward along a hollow guide rod 10, extending in the longitudinal direction of the vehicle and being supported by the U-shaped gutter portion of a mounting frame 9. Each of the two hollow guide rods 10 has a longitudinal slot 11, through which a lip 12 of the cooperating front support 8 is passed. An actuating member 13 (FIG. 4) is rotatably fastened on the rear member of the mounting frame 9. Upon rotation of this actuating member 13 a drive wheel 14 is driven, which engages two flexible push-pull-cables 15. These cables 15 extend in the transverse U-shaped gutter portion of the mounting frame 9 in opposite directions and subsequently extend forward in the longitudinal direction of the vehicle in the U-shaped gutter portions of the mounting frame 9 on both sides thereof. The cables 15 are introduced in the hollow guide rods 10 from the rear open end and engage the lips 12 of the front supports 8.

The angle sections 5 each comprise a slot 16 in their rear portion, with which a cross-pin 17 is rotatably and slidably in engagement. Each cross-pin 17 is connected to the upper end of a lever 18, which is pivotally supported at its lower end on a bracket 19, which is fastened in the U-shaped gutter portion of the mounting frame 9. The axes of rotation 20 of the two levers 18 are in line with each other and extend horizontally in the transverse direction of the vehicle. A spring 21 acts on each of the two cross-pins 17. Each spring 17 is fastened at its rear end to the cooperating angle section 5 and loads the cross-pin 17 in the direction of the upwardly sloping rear end 22 of the slot 16.

Figure 4:
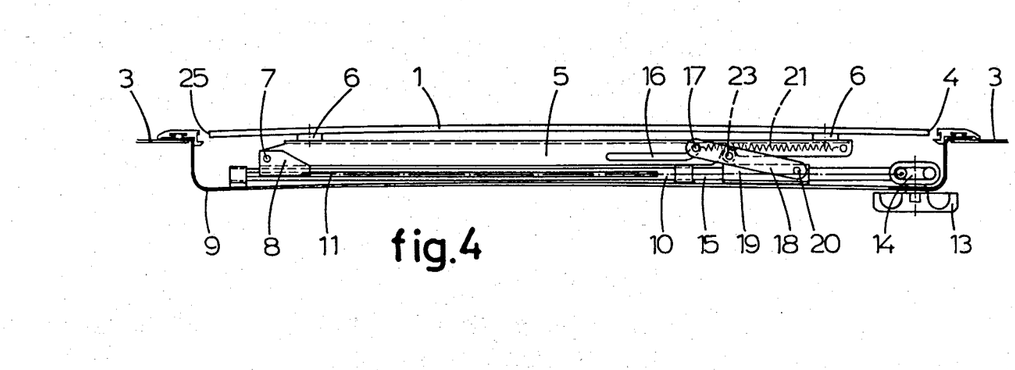
FIG. 4 is a section along the line IV—IV in FIG. 1 on a larger scale.
Figure 5:
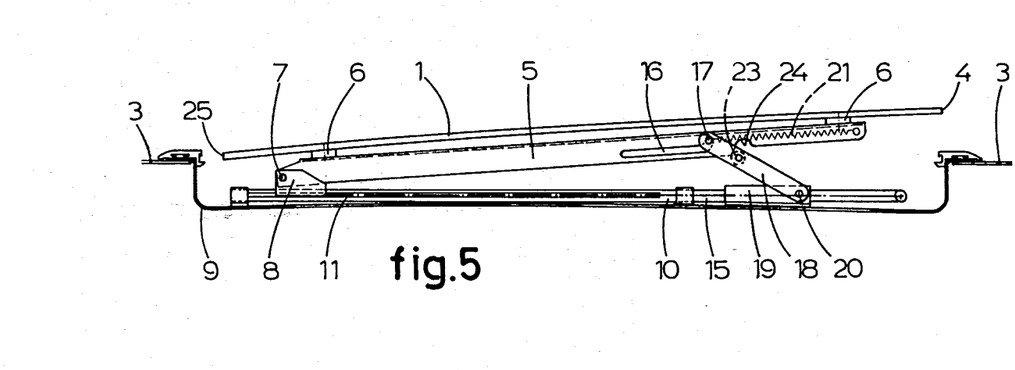
FIGS. 5, 6 and 7 are sections corresponding to FIG. 4, but with the sliding roof in various other positions.

In the front or closed position of the panel 1 shown in FIG. 4, the levers 18 extend forwardly from their axes of rotation 20 under a small angle with the horizontal plane. For the backward displacement of the panel 1 from this position the actuating member 13 is rotated in such a sense that the two flexible cables 15 move the front supports 8 in the rearward direction along the hollow guide rods 10. At first the cross-pins 17 remain in engagement with the rear ends 22 of the slots 16 under the influence of the springs 21, so that the levers 18 swivel upward and subsequently downward again beyond their vertical position, thereby successively taking up the positions according to FIGS. 5 and 6.

Figure 6:
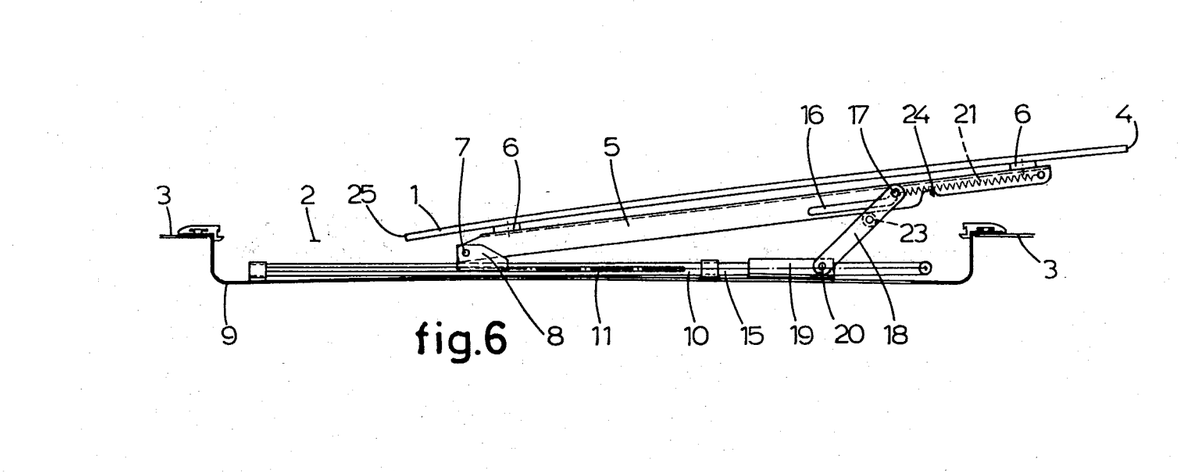
Figure 7:
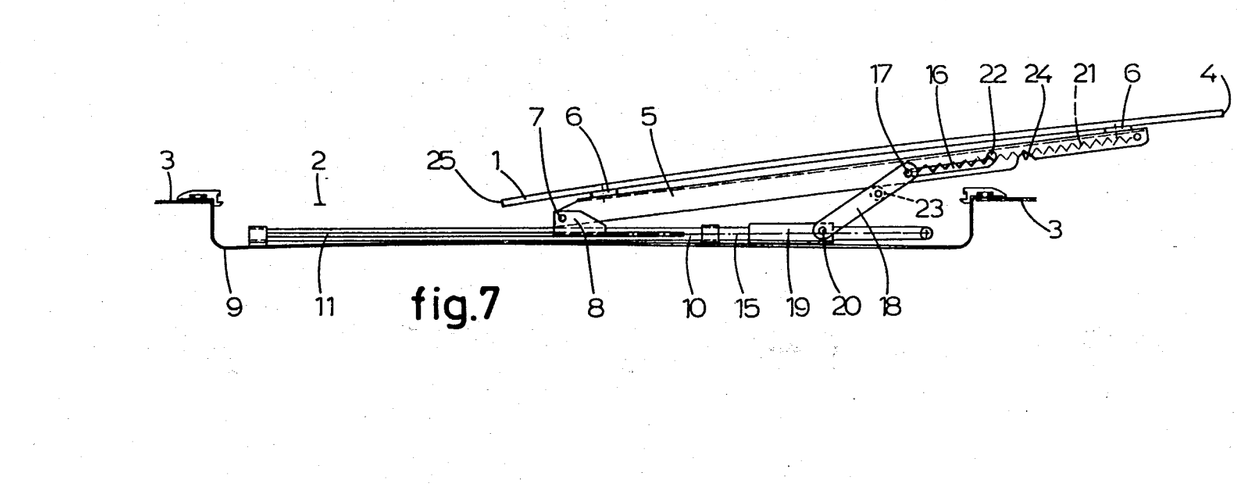

The levers 18 each carry a stop 23, which lies in a bottom recess 24 in the lower edge of the cooperating angle section 5 in the front position of the panel 1 (FIG. 4). In a rearwardly inclined position of the levers 18 the stops 23 again engage the lower edge of the angle sections 5 (FIG. 6).

When the front supports 8 are displaced further to the rear along the hollow guide rods 10 by means of the actuating member 13 and the cables 15, the cross-pins 17 will pass through the slots 16 in the angle sections 5, against the action of the springs 21, while the levers 18 swivel still further downwardly in the rearward direction. After the cross-pins 17 have reached the front end of the slots 16, no further rearward displacement of the panel 1 is possible and this panel 1 has therefore reached its rear end position. In this rear end position the panel 1 encloses a very small angle with the horizontal plane. This angle is preferably smaller than 10°. In this way it is achieved that the panel 1 extends at a relatively small height above the fixed roof 3, which is favourable from an aerodynamic point of view.

The front edge of the opening 2 in the fixed roof 3 and the front edge 25 of the panel 1 lie at a considerable distance from each other when the panel 1 is in its rear end position, so that a large ventilating opening is released at the front side of the panel 1. By the application of long slots 16 it becomes possible to obtain a very large maximum ventilating opening.

In order to move the panel 1 forward again to the closed position, the actuating member 13 is rotated in the opposite direction, in order to bring about that the flexible cables 15 push the front supports 8 forward, so that the cross-pins 17 pass through the slots 16, whereupon the levers 18 are swung forward until the stops 23 are received in the lower recesses 24 in the bottom edges of the angle sections 5.

Figure 8:
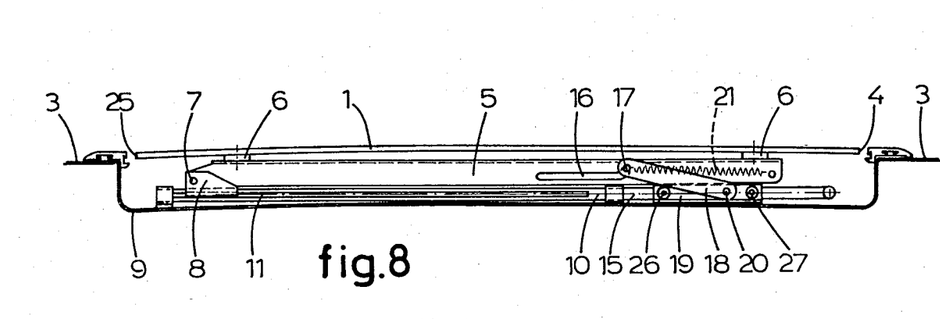
FIGS. 8 and 9 are sections of a slightly modified sliding roof according to the invention in the front position and in the rear position respectively.
Figure 9:
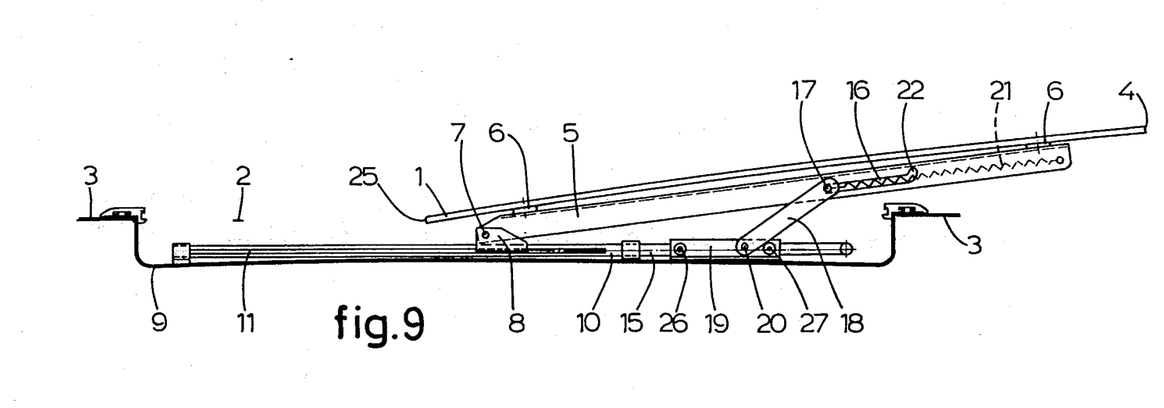

FIGS. 8 and 9 show a slightly modified embodiment of the sliding roof according to the invention. In this sliding roof no stops 23 are applied on the levers 18, but these levers 18 cooperate with a front stop 26 and a back stop 27 on the brackets 19, with which the levers 18 engage in their front end position (FIG. 8), or in their rear end position (FIG. 9) respectively.

FIGS. 10-13 inclusive show a further modified embodiment of the sliding roof according to the invention, wherein means are applied for lifting the panel when moving the panel from the closed position, whilst furthermore the rear of the panel is locked in the closed position.

For this purpose each angle section 5 is provided with a guide slot 28 at its front end, which guide slot 28 is at least partly inclined backwards and downwards. Each cross-shaft 7 is in engagement with the relative guide slot 28. Each guide slot 28 comprises a slot portion, which connects to the upper front end of the inclined slot portion and which extends forwardly in the longitudinal direction of the relative angle section 5. This latter slot portion extends at least approximately horizontally in the closed position of the panel 1.

Each angle section 5 cooperates with a connecting strip 29. The front end of each connecting strip 29 is pivotally mounted on the cross-shaft 7 connected to the relative front support 8, while the rear end of this connecting strip 29 carries a guide pin 30, which is slidable in a longitudinal slot 31 in the relative angle section 5. Each connecting strip 29 carries a locking member near its rear end, which is in engagement with a locking slot 32 in the bracket 19 in the closed position of the panel 1. Each locking slot 32 is open at the rear side. A spring 33 is mounted between each angle section 5 and the cooperating connecting strip 29, which spring 33 loads the connecting strip 29 in the rearward direction.

Each connecting strip 29 is provided with a flanged lip at its underside near the rear end, which lip comprises a downwardly flanged part 34, which forms the locking member. The locking slot 32 in each bracket 19 comprises a front portion, which is at least approximately horizontal and a portion which is inclined obliquely backwards and upwards and which lies behind the horizontal portion. An at least approximately horizontal edge portion 35 extends behind the lower edge of each locking slot 32.

Figure 10:
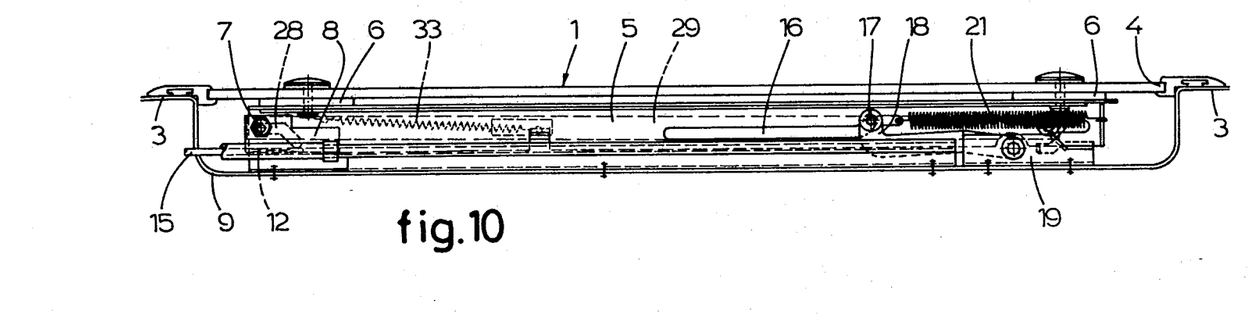
FIG. 10 is a longitudinal section of a further modified embodiment of the sliding roof according to the invention, wherein the panel is locked in the closed position.
Figure 11:
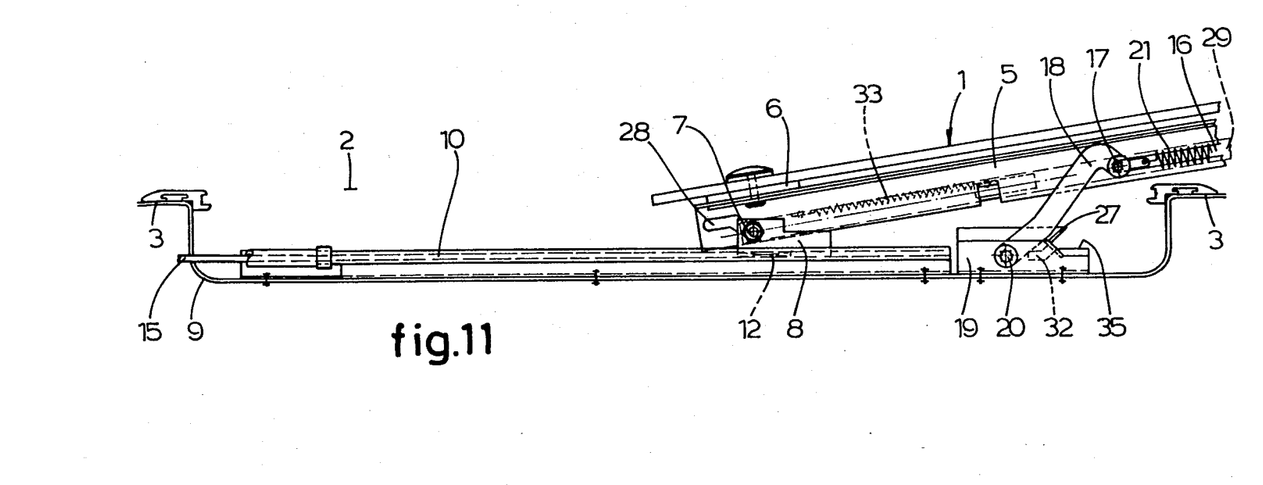
FIG. 11 is a section corresponding to FIG. 10, wherein, however, the panel is in the rear end position.
Figure 12:
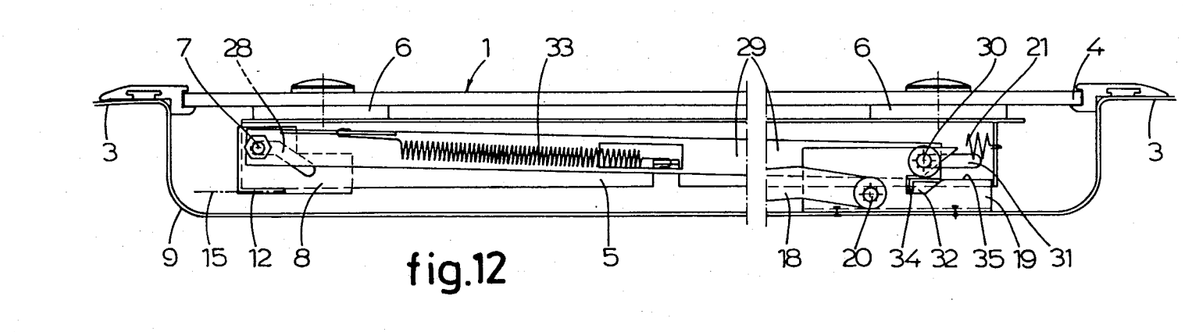
FIG. 12 is a partial side view of the sliding roof according to FIG. 10 on a larger scale, wherein the panel is locked in the closed position.

A rearward displacement of the panel 1 from the front or closed position shown in FIGS. 10 and 12 is obtained, when the actuating member is turned in such a sense, that both flexible cables 15 move the front supports 8 in the rearward direction along the hollow guide rods 10. The angle sections 5, and therefore the panel 1 as well, are first slightly lifted, because the cross-shafts 7 pass through the guide slots 28 in the angle sections 5, while at the same time the parts 34 which form the locking members, follow the slots 32.

In this way it is prevented that the seal along the front edge of the opening 2 in the fixed roof 3 and/or along the front edge of the panel 1 can be damaged, when the panel 1 is brought in the rearwardly and upwardly inclined position and back.

During this displacement of the connecting strips 29 as well as during a further portion of the backward displacement of the front supports 8 along the hollow guide rods 10 the cross-pins 17 remain in engagement with the rear ends of the slots 16 under the influence of the springs 21, so that the levers 18 swivel upward and subsequently downward again beyond their vertical position.

The levers 18 cooperate with a rear stop 27 on the brackets 19, with which the levers 18 come into engagement in their rear end position.

When the front supports 8 are displaced further rearward along the hollow guide rods 10 by means of the cables 15, the cross-pins 17 will pass through the slots 16 in the angle sections 5, against the action of the springs 21. After the cross-pins 17 have reached the front end of the slots 16, no further backward displacement of the panel 1 is possible and this panel 1 has therefore reached its rear end position.

Figure 13:
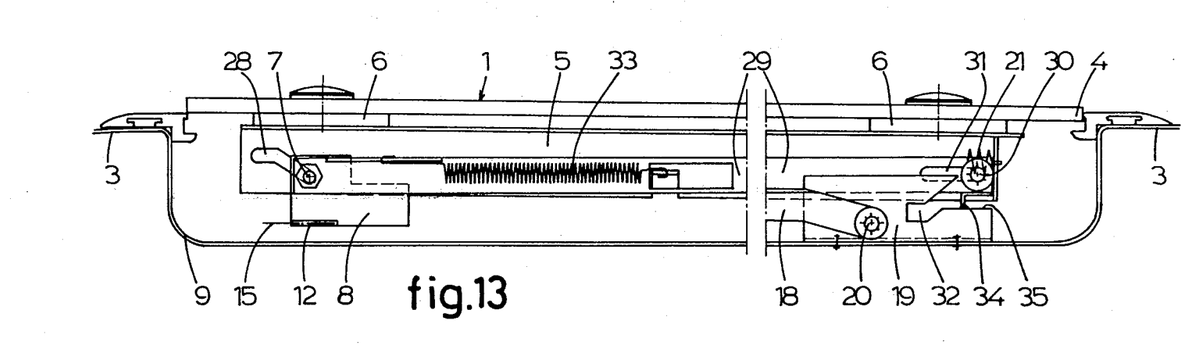
FIG. 13 is a side view corresponding to FIG. 12, wherein, however, the panel is unlocked and slightly lifted.

In order to move the panel 1 forward again towards the closed position, the actuating member is rotated in the opposite direction, so that the flexible cables 15 push the front supports 8 forward, the cross-pins 17 pass through the slots 16 and the levers 18 are subsequently swung forward, whereby the position according to FIG. 13 is reached.

Hereafter the panel 1 can practically not be moved forward any further and the cross-shafts 7 pass through the guide slots 28, while at the same time the end parts 34 which function as the locking members, enter the locking slots 32 and reach the front end position therein. In this way the angle sections 5, together with the panel 1 mounted thereon, are moved down to the closed position, in which they are locked as a result of the cooperation of the end parts 34 functioning as the locking members, and the locking slots 32.

In this way the closed panel 1 is guarded against lifting by unauthorized persons, while it is also prevented that a small clearance could be formed at the rear of the panel 1 in the closed position during driving of the vehicle, which could result in a disagreeable noise.

According to the invention a sliding roof for a vehicle is provided, which has a very simple and cheap construction and which is automatically held in any desired position by the application of an actuating member 13 with built-in brake means.

The panel 1 may consist of glass, or of a plate of transparent artificial material, while as an alternative it is also possible to manufacture the panel 1 from other materials, e.g. from metal.

Because the operating mechanism for the displacemnet of the panel 1 does not directly engage this panel 1, the panel can be changed very easily and can e.g. be substituted by a panel 1 from a different material, without readjusting operations being necessary.

The invention is not restricted to the embodiments shown in the drawings by way of example, which may be varied in several ways within the scope of the appended claims.

I claim:

1. A sliding roof for a vehicle, comprising a panel, which in its forward position closes an opening in the fixed roof and which, upon operation of an actuating member, raises its rear edge and is partly displaceable outside the roof opening into positions above the fixed roof, the panel near its front edge being supported by a horizontal cross-shaft of at least one front support, said front support being movable backward and forward in the longitudinal direction of the vehicle, the actuating member engaging the front support and moving the same in the longitudinal direction of the vehicle in order to displace the panel, whilst at least one cross-pin at the upper end of a lever engages the panel backwards from the front support, said lever being pivotally supported at its lower end for pivotal movement about a horizontal transverse axis, the cross-pin at the upper end of the lever being rotatably and slidably engaged with a slot formed underneath the panel, so that during a displacement of the panel from the front position, the lever first reaches a position defined by a stop, whereafter the cross-pin passes through the slot; and vice-versa, on either side a section is mounted underneath the panel, which sections extend in the longitudinal direction of the vehicle, each of these two sections being pivotally connected to a cooperating front support and being provided with a slot, with which a cross-pin is in engagement which is connected to a lever which is pivotally supported on the relative side, the two front supports are each movable backward and forward along a hollow guide rod extending in the longitudinal direction of the vehicle and having a longitudinal slot, through which a lip of the cooperating front support is passed, whilst the actuating member displaces the front supports by means of flexible cables.

2. A sliding roof as claimed in claim 1, wherein the levers cooperate with stationary stops, which define their front and rear end positions.

3. A sliding roof as claimed in claim 1, wherein each cross-pin is engaged by a spring, which loads the cross-pin in the direction of the rear end of the cooperating slot.

4. A sliding roof as claimed in claim 3, wherein each slot has an upwardly sloping rear end.

5. A sliding roof as claimed in claim 1, wherein on either side the guide rod and the lever are supported on a common support means.

6. A sliding roof for a vehicle, comprising a panel, which in its forward position closes an opening in the fixed roof and which, upon operation of an actuating member, raises its rear edge and is partly displaceable outside the roof opening into positions above the fixed roof, the panel near its front edge being supported by a horizontal cross-shaft of at least one front support, said front support being movable backward and forward in the longitudinal direction of the vehicle, the actuating member engaging the front support and moving the same in the longitudinal direction of the vehicle in order to displace the panel, whilst at least one cross-pin at the upper end of a lever engages the panel backwards from the front support, said lever being pivotally supported at its lower end for pivotal movement about a horizontal transverse axis, the cross-pin at the upper end of the lever being rotatably and slidably engaged with a slot formed underneath the panel, so that during a displacement of the panel from the front position, the lever first reaches a position defined by a stop, whereafter the cross-pin passes through the slot; and vice-versa, on either side a section is mounted underneath the panel, which sections extend in the longitudinal direction of the vehicle, each of these two sections being pivotally connected to a cooperating front support and being provided with a slot, with which a cross-pin is in engagement which is connected to a lever which is pivotally supported on the relative side, the levers carry a stop, which engage the sections before the cross-pins pass through the slots.

7. A sliding roof as claimed in claim 6, wherein each of the two sections also comprises a lower recess, wherein the stop carried by the cooperating lever is received in the front position of the panel.

8. A sliding roof for a vehicle, comprising a panel, which in its forward position closes an opening in the fixed roof and which, upon operation of an actuating member, raises its rear edge and is partly displaceable outside the roof opening into positions above the fixed roof, the panel near its front edge being supported by a horizontal cross-shaft of at least one front support, said front support being movable backward and forward in the longitudinal direction of the vehicle, the actuating member engaging the front support and moving the same in the longitudinal direction of the vehicle in order to displace the panel, whilst at least one cross-pin at the upper end of a lever engages the panel backwards from the front support, said lever being pivotally supported at its lower end for pivotal movement about a horizontal transverse axis, the cross-pin at the upper end of the lever being rotatably and slidably engaged with a slot formed underneath the panel, so that during a displacement of the panel from the front position, the lever first reaches a position defined by a stop, whereafter the cross-pin passes through the slot; and vice-versa, means for lifting at least the front side of the panel when moving the panel from the closed position, on either side a section is mounted underneath the panel, which sections extend in the longitudinal direction of the vehicle, and in which the relative slot is formed, which is in engagement with the cooperating cross-pin, while furthermore, a guide slot is formed in each section near the front end, which guide slot is at least partly inclined backwards and downwards and with which the cross-shaft cooperates, which is connected to the relative front support, each cross-shaft is subjected to a spring tension acting rearwards, each guide slot comprises a slot portion, which connects to the upper front end of the inclined slot portion and which extends forwardly in the longitudinal direction of the relative section and at least approximately horizontally in the closed position of the panel.

9. A sliding roof for a vehicle, comprising a panel, which in its forward position closes an opening in the fixed roof and which, upon operation of an actuating member, raises its rear edge and is partly displaceable outside the roof opening into positions above the fixed roof, the panel near its front edge being supported by a horizontal cross-shaft of at least one front support, said front support being movable backward and forward in the longitudinal direction of the vehicle, the actuating member engaging the front support and moving the same in the longitudinal direction of the vehicle in order to displace the panel, whilst at least one cross-pin at the upper end of a lever engages the panel backwards from the front support, said lever being pivotally supported at its lower end for pivotal movement about a horizontal transverse axis, the cross-pin at the upper end of the lever being rotatably and slidably engaged with a slot formed underneath the panel, so that during a displacement of the panel from the front position, the lever first reaches a position defined by a stop, whereafter the cross-pin passes through the slot; and vice-versa, means for lifting at least the front side of the panel when moving the panel from the closed position, on either side a section is mounted underneath the panel, which sections extend in the longitudinal direction of the vehicle, and in which the relative slot is formed, which is in engagement with the cooperating cross-pin, while furthermore, a guide slot is formed in each section near the front end, which guide slot is at least partly inclined backwards and downwards and with which the cross-shaft cooperates, which is connected to the relative front support, each section cooperates with a connecting strip, the front end of said connecting strip being pivotally mounted on the cross-shaft, connected to the relative front support, while the rear end of this connecting strip carries a guide pin, which is slidable in a longitudinal slot in the relative section, each connecting strip being further provided with a locking member near its rear end, which is in engagement with a locking slot in a fixed bracket in the closed position of the panel, said locking slot being open at the rear side.

10. A sliding roof as claimed in claim 9, wherein a spring is mounted between each section and the cooperating connecting strip, which spring loads the connecting strip in the rearward direction.

11. A sliding roof as claimed in claim 10, wherein each connecting strip is provided with a flanged lip at its underside near the rear end, which lip comprises a downwardly flanged part, which forms the locking member.

12. A sliding roof as claimed in claim 11, wherein the locking slot in each bracket comprises a front portion which is at least horizontal and a portion which is inclined backwards and upwards and which lies behind the horizontal portion.

13. A sliding roof as claimed in claim 12, wherein an at least approximately horizontal edge portion extends behind the rear edge of each locking slot.

14. A sliding roof for a vehicle, having a fixed roof with an opening therein, comprising a panel which in its forward and lowermost position closes said opening in said fixed roof; at least one front support, guided in said vehicle for backward and forward movement in the longitudinal direction of the vehicle, said front support carrying a horizontal cross shaft which supports the panel near the front end of said panel, said front support occupying its foremost position in the closed position of the panel; an actuating member engaging said front support and adapted to move the same backward and forward; at least one lever, which is supported at its lower end in the vehicle for pivotal movement about a horizontal transverse axis, said lever occupying its foremost position in the closed position of the panel; a cross pin connected to the upper end of said lever; a slot formed underneath said panel and associated therewith, said cross pin slidably engaging said slot and occupying its rear position in said slot in the closed position of said panel; resilient means loading the cross pin in the rearward direction of said slot; and a stop means defining the position of said lever wherein a displacement of said slot with respect to said cross pin is initiated, said pivotal lever movement before said latter lever position is reached raising the rear edge of said panel with respect to its lowermost position, while said displacement of said slot with respect to said cross-pin causes said panel with its raised edge to be partly displaced outside the roof opening into positions above the fixed roof.

15. A sliding roof as claimed in claim 14, wherein on either side a section is mounted underneath the panel, which sections extend in the longitudinal direction of the vehicle, each of these two sections being pivotally connected to a cooperating front support and being provided with a slot, with which a cross-pin is engagement which is connected to a lever which is pivotally supported on the relative side.

16. A sliding roof as claimed in claim 14, wherein the panel in its rear end position encloses an angle with the horizontal plane, which is smaller than 10°.

17. A sliding roof as claimed in claim 14, further comprising means for lifting at least the front side of the panel when moving the panel from the closed position.

18. A sliding roof as claimed in claim 17, wherein on either side a section is mounted underneath the panel, which sections extend in the longitudinal direction of the vehicle, and in which the relative slot is formed, which is in engagement with the cooperating cross-pin, while furthermore a guide slot is formed in each section near the front end, which guide slot is at least partly inclined backwards and downwards, and with which the cross-shaft cooperates, which is connected to the relative front support.

19. A sliding roof as claimed in claim 18, wherein each cross-shaft is subjected to a spring tension acting rearwards.

20. A sliding roof as claimed in claim 14, further comprising means for locking the rear side of the panel in the closed position.

* * * * *